US011951625B2

(12) United States Patent
Karito

(10) Patent No.: US 11,951,625 B2
(45) Date of Patent: Apr. 9, 2024

(54) CONTROL METHOD FOR ROBOT AND ROBOT SYSTEM

(71) Applicant: Seiko Epson Corporation, Tokyo (JP)

(72) Inventor: Nobuhiro Karito, Kiso (JP)

(73) Assignee: SEIKO EPSON CORPORATION (JP)

( * ) Notice: Subject to any disclaimer, the term of this patent is extended or adjusted under 35 U.S.C. 154(b) by 100 days.

(21) Appl. No.: 17/361,425

(22) Filed: Jun. 29, 2021

(65) Prior Publication Data

US 2021/0402596 A1 Dec. 30, 2021

(30) Foreign Application Priority Data

Jun. 30, 2020 (JP) .................................. 2020-112527

(51) Int. Cl.
*B25J 9/16* (2006.01)
(52) U.S. Cl.
CPC ........... *B25J 9/1633* (2013.01); *B25J 9/1661* (2013.01)
(58) Field of Classification Search
CPC ...... B25J 9/1633; B25J 9/1661; B25J 9/1602; B25J 9/163; B25J 9/1664; G05B 2219/39322
See application file for complete search history.

(56) References Cited

U.S. PATENT DOCUMENTS

| 10,946,519 | B1* | 3/2021 | Prats ..................... G05B 15/00 |
| 2005/0080512 | A1* | 4/2005 | Critchlow ............. B25J 9/1692 |
| 2009/0125146 | A1* | 5/2009 | Zhang .................. G05B 19/423 |
| | | | 700/253 |
| 2016/0089789 | A1* | 3/2016 | Sato ....................... B25J 13/088 |
| | | | 700/254 |
| 2016/0243704 | A1* | 8/2016 | Vakanski ............... B25J 9/1664 |
| 2016/0257003 | A1* | 9/2016 | Oyama .................. B25J 9/1674 |

FOREIGN PATENT DOCUMENTS

| JP | H06-031663 A | 2/1994 |
| JP | H06-170763 A | 6/1994 |
| JP | 2012-176478 A | 9/2012 |
| JP | 2015-000455 A | 1/2015 |

* cited by examiner

*Primary Examiner* — Adam R Mott
*Assistant Examiner* — Elizabeth Rose Neleski
(74) *Attorney, Agent, or Firm* — Harness, Dickey & Pierce, P.L.C.

(57) ABSTRACT

A control method for a robot includes a first working step of executing first work on a first working object by operating a robot arm by force control based on a predetermined position command value, a first memory step of storing first position information of a trajectory in which a control point set for the robot arm passes at the first working step, and a second working step of updating a position command value for the robot arm based on the first position information stored at the first memory step, and executing second work on a second working object by operating the robot arm by the force control based on an updated value as the updated position command value.

7 Claims, 9 Drawing Sheets

CONTROL METHOD FOR ROBOT AND ROBOT SYSTEM

The present application is based on, and claims priority from JP Application Serial Number 2020-112527, filed Jun. 30, 2020, the disclosure of which is hereby incorporated by reference herein in its entirety.

BACKGROUND

1. Technical Field

The present disclosure relates to a control method for a robot and a robot system.

2. Related Art

For example, as shown in JP-A-6-31663, a robot having a robot arm with a distal end to which a tool is attached and performing predetermined work on an object member for work by driving the robot arm is known.

The robot shown in JP-A-6-31663 performs operation by profile control to perform machining along a surface of the object member or the like. Specifically, a contact force between the robot arm and the object member is detected while the robot arm is moved to move the tool toward a preset target position. Further, the target position is corrected so that the detected force may be equal to a target force and the robot arm is operated at a predetermined velocity.

In order to reliably bring the tool into contact with the object member, the target position in the profile control is set to a position at a distance longer than an actual distance between the tool and the object member. That is, the position in which the tool and the object member are actually in contact is different from the target position. The robot arm is operated at a lower velocity until the tool and the object member come into contact, and the working time is longer depending on the amount of difference. Particularly, when work is performed on a plurality of workpieces, the accumulated working time is longer.

SUMMARY

A control method for a robot according to an aspect of the present disclosure is a control method for a robot having a robot arm that performs first work on a first working object and performs second work of a same type as the first work on a second working object of a same type as the first working object, including a first working step of executing the first work on the first working object by operating the robot arm by force control based on a predetermined position command value, a first memory step of storing first position information of a trajectory in which a control point set for the robot arm passes at the first working step, and a second working step of updating a position command value for the robot arm based on the first position information stored at the first memory step, and executing the second work on the second working object by operating the robot arm by the force control based on an updated value as the updated position command value.

A robot system according to an aspect of the present disclosure includes a robot arm that performs first work on a first working object and performs second work of a same type as the first work on a second working object of a same type as the first working object, and a control unit having a memory section and controlling an operation of the robot arm, wherein the control unit executes the first work on the first working object by operating the robot arm by force control based on a predetermined position command value, stores first position information of a trajectory in which a control point set for the robot arm passes in the first work, updates a position command value for the robot arm based on the stored first position information, and executes the second work on the second working object by operating the robot arm by the force control based on an updated value as the updated position command value.

DESCRIPTION OF EXEMPLARY EMBODIMENTS

First Embodiment

Figure 1:
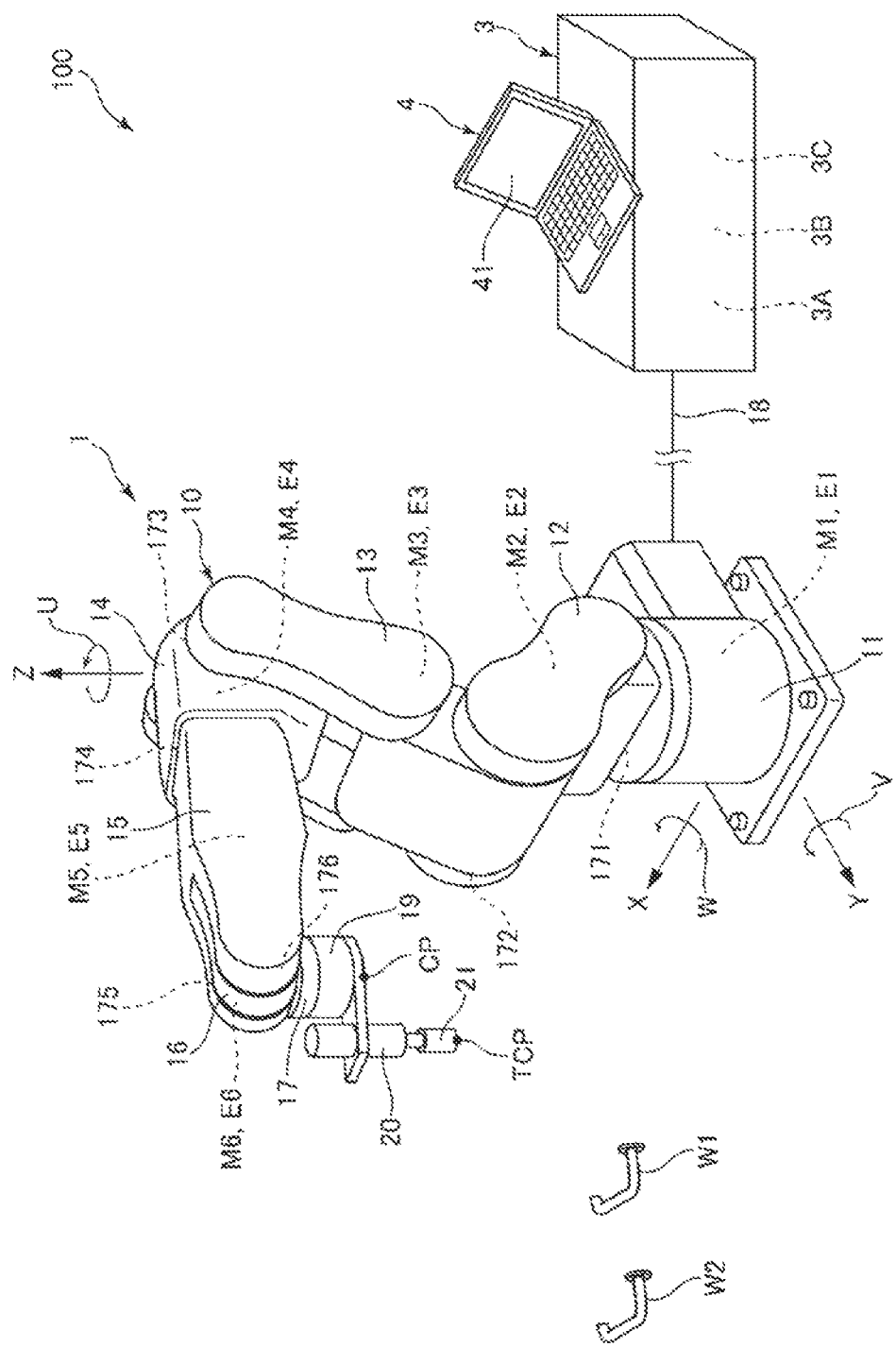
FIG. 1 shows an overall configuration of a robot system of a first embodiment.
Figure 2:
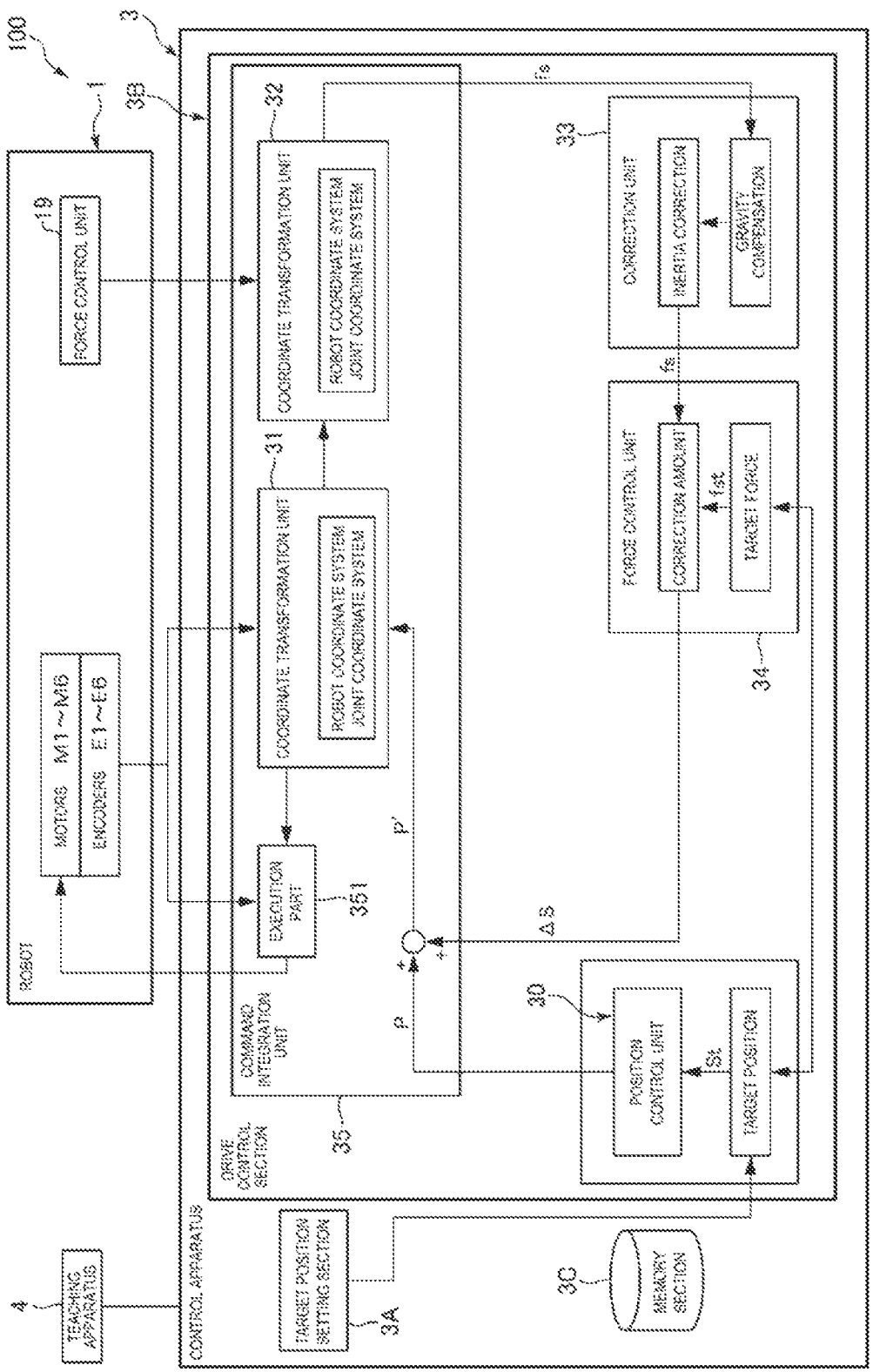
FIG. 2 is a block diagram of the robot system shown in FIG. 1.
Figure 3:
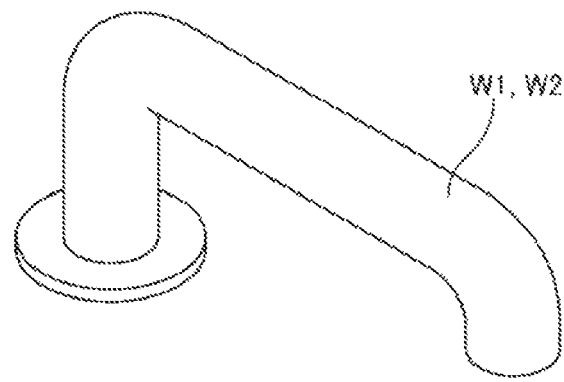
FIG. 3 is a perspective view of a workpiece as a working object of a robot shown in FIG. 1.
Figure 4:
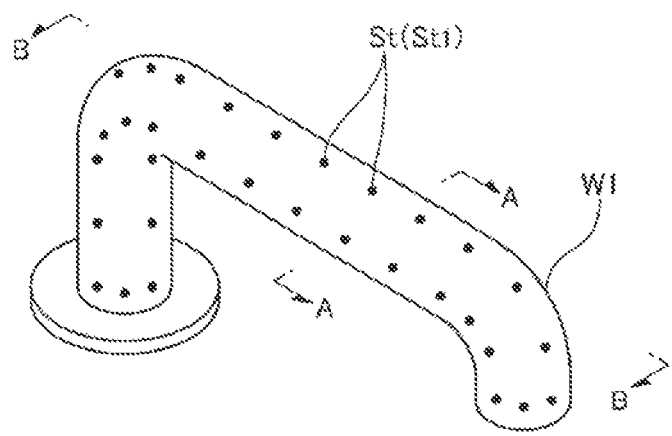
FIG. 4 is a perspective view showing a state in which target positions are set in the workpiece shown in FIG. 3.
Figure 5:
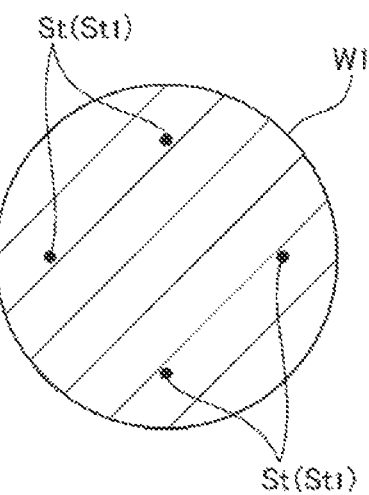
FIG. 5 is a sectional view along line A-A in FIG. 4.
Figure 6:
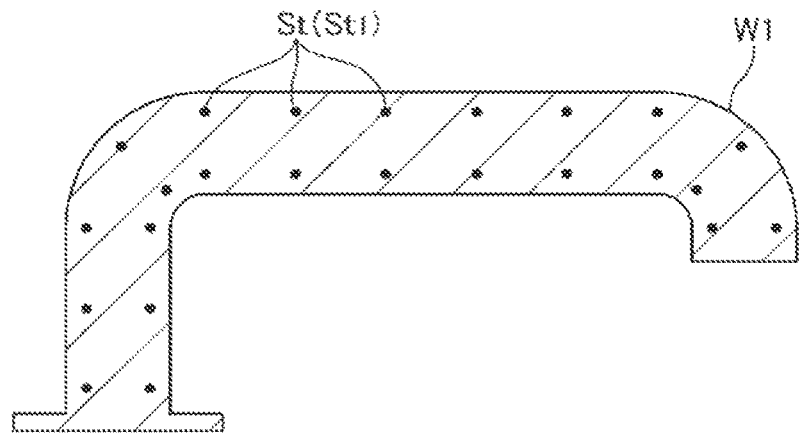
FIG. 6 is a sectional view along line B-B in FIG. 4.
Figure 7:
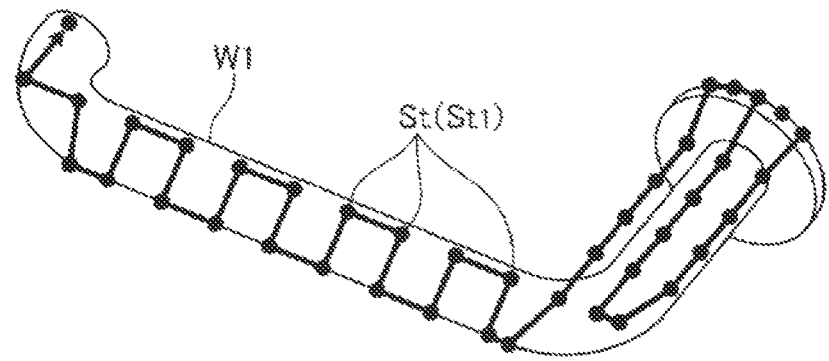
FIG. 7 is a perspective view of the workpiece shown in FIG. 3, in which an order of the respective target positions through which a control point passes is shown by arrows.
Figure 8:
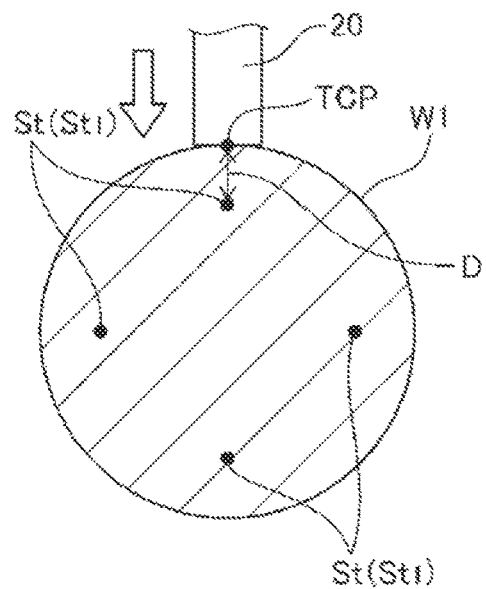
FIG. 8 is the sectional view along line A-A in FIG. 4 showing a state in which work is performed.
Figure 9:
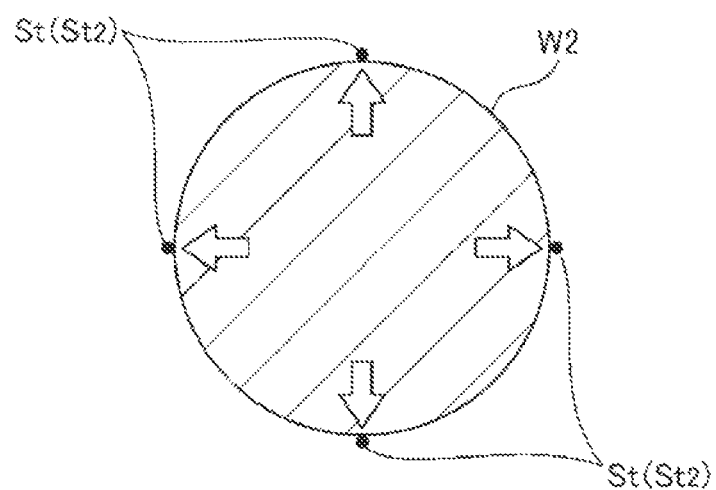
FIG. 9 is a cross-sectional view of the workpiece showing a state in which target positions for second work are set.
Figure 10:
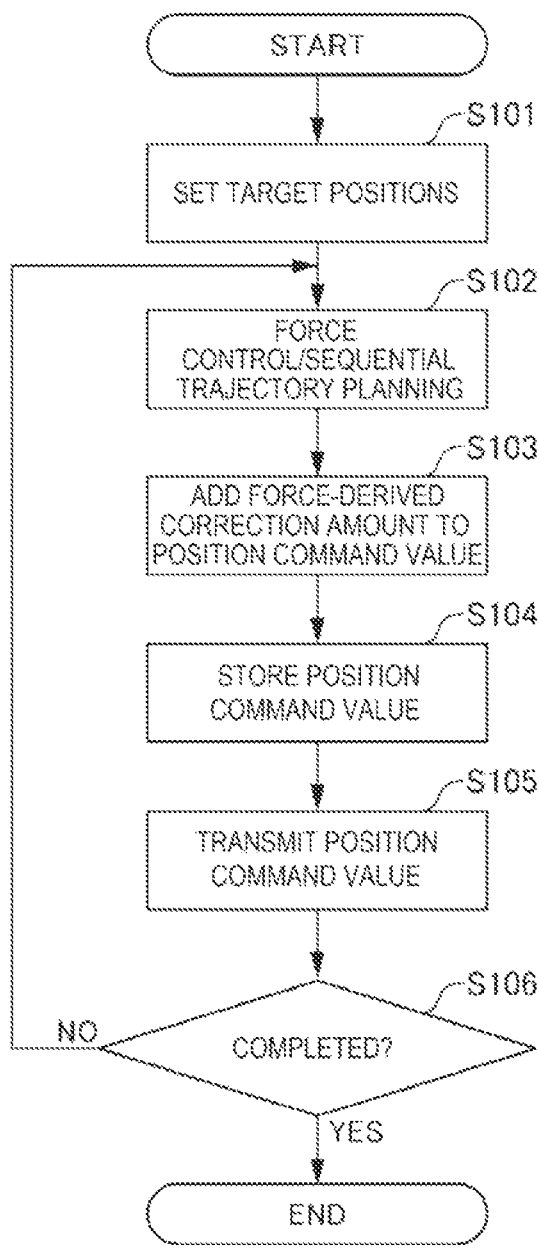
FIG. 10 is a flowchart for explanation of a control operation performed by a control apparatus shown in FIG. 2 for first work.
Figure 11:
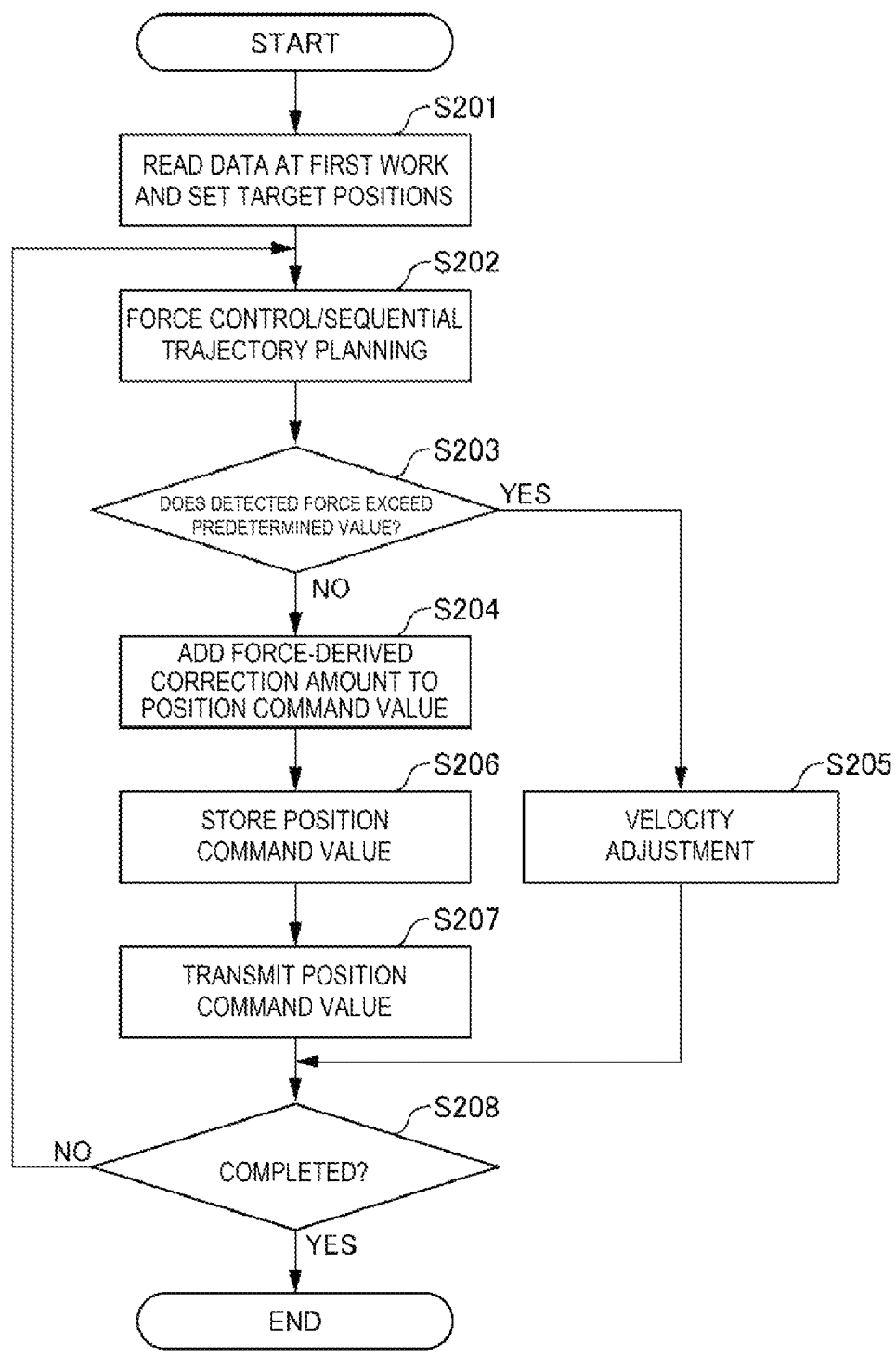
FIG. 11 is a flowchart for explanation of the control operation performed by the control apparatus shown in FIG. 2 for the second work.

FIG. 1 shows an overall configuration of a robot system of a first embodiment. FIG. 2 is a block diagram of the robot system shown in FIG. 1. FIG. 3 is a perspective view of workpieces as working objects of a robot shown in FIG. 1. FIG. 4 is a perspective view showing a state in which target positions are set in the workpiece shown in FIG. 3. FIG. 5 is a sectional view along line A-A in FIG. 4. FIG. 6 is a sectional view along line B-B in FIG. 4. FIG. 7 is a perspective view of the workpiece shown in FIG. 3, in which order of the respective target positions through which a control point passes are shown by arrows. FIG. 8 is the sectional view along line A-A in FIG. 4 showing a state in which work is performed. FIG. 9 is a cross-sectional view of the workpiece showing a state in which target positions for second work are set. FIG. 10 is a flowchart for explanation of a control operation performed by a control apparatus shown in FIG. 2 for first work. FIG. 11 is a flowchart for explanation of the control operation performed by the control apparatus shown in FIG. 2 for the second work.

As below, a control method for a robot and a robot system according to the present disclosure will be explained in detail based on preferred embodiments shown in the accompanying drawings. Hereinafter, for convenience of explanation, a +Z-axis direction, i.e., the upside in FIG. 1 is also referred to as "upper" and a −Z-axis direction, i.e., the downside is also referred to as "lower". Further, regarding a robot arm, a base 11 side in FIG. 1 is also referred to as "proximal end" and the opposite side, i.e., an end effector 20 side is also referred to as "distal end". Furthermore, the Z-axis directions, i.e., the upward and downward directions in FIG. 1 are referred to as "vertical direction" and X-axis directions and Y-axis directions, i.e., the leftward and rightward directions are referred to as "horizontal direction".

As shown in FIG. 1, a robot system 100 includes a robot 1 that sequentially performs work on a workpiece W1 as a first working object and a workpiece W2 as a second working object, a control apparatus 3 that controls the robot 1, and a teaching apparatus 4, and executes a control method for the robot according to the present disclosure.

First, the robot 1 is explained.

The robot 1 shown in FIG. 1 is a single-arm six-axis vertical articulated robot in the embodiment, and has a base 11 and a robot arm 10. Further, an end effector 20 may be attached to the distal end portion of the robot arm 10. The end effector 20 may be a component element of the robot 1 or not a component element of the robot 1.

Note that the robot 1 is not limited to the illustrated configuration, but may be e.g. a dual-arm articulated robot. Or, the robot 1 may be a horizontal articulated robot.

The base 11 is a supporter that driveably supports the robot arm 10 from the downside and fixed to e.g. a floor within a factory or the like. In the robot 1, the base 11 is electrically coupled to the control apparatus 3 via a relay cable 18. Note that the coupling between the robot 1 and the control apparatus 3 is not limited to the wired coupling like the configuration shown in FIG. 1, but may be e.g. wireless coupling or coupling via a network such as the Internet.

In the embodiment, the robot arm 10 has a first arm 12, a second arm 13, a third arm 14, a fourth arm 15, a fifth arm 16, and a sixth arm 17, and these arms are sequentially coupled from the base 11 side. Note that the number of the arms of the robot arm 10 is not limited to six, but may be e.g. one, two, three, four, five, seven, or more. The sizes including the entire lengths of the respective arms are not particularly limited, but can be appropriately set.

The base 11 and the first arm 12 are coupled via a joint 171. Further, the first arm 12 is pivotable about a first pivot axis parallel to the vertical direction as a pivot center relative to the base 11. The first pivot axis is aligned with a normal of the floor to which the base 11 is fixed.

The first arm 12 and the second arm 13 are coupled via a joint 172. Further, the second arm 13 is pivotable about a second pivot axis parallel to the horizontal direction as a pivot center relative to the first arm 12. The second pivot axis is parallel to an axis orthogonal to the first pivot axis.

The second arm 13 and the third arm 14 are coupled via a joint 173. Further, the third arm 14 is pivotable about a third pivot axis parallel to the horizontal direction as a pivot center relative to the second arm 13. The third pivot axis is parallel to the second pivot axis.

The third arm 14 and the fourth arm 15 are coupled via a joint 174. Further, the fourth arm 15 is pivotable about a fourth pivot axis parallel to the center axis direction of the third arm 14 as a pivot center relative to the third arm 14. The fourth pivot axis is orthogonal to the third pivot axis.

The fourth arm 15 and the fifth arm 16 are coupled via a joint 175. Further, the fifth arm 16 is pivotable about a fifth pivot axis as a pivot center relative to the fourth arm 15. The fifth pivot axis is orthogonal to the fourth pivot axis.

The fifth arm 16 and the sixth arm 17 are coupled via a joint 176. Further, the sixth arm 17 is pivotable about a sixth pivot axis as a pivot center relative to the fifth arm 16. The sixth pivot axis is orthogonal to the fifth pivot axis.

Furthermore, the sixth arm 17 is a robot distal end portion located at the most distal end side of the robot arm 10. The sixth arm 17 may pivot together with the end effector 20 by driving of the robot arm 10.

The robot 1 includes a motor M1, a motor M2, a motor M3, a motor M4, a motor M5, and a motor M6 as drive units and an encoder E1, an encoder E2, an encoder E3, an encoder E4, an encoder E5, and an encoder E6. The motor M1 is provided inside of the joint 171 and relatively rotates the base 11 and the first arm 12. The motor M2 is provided inside of the joint 172 and relatively rotates the first arm 12 and the second arm 13. The motor M3 is provided inside of the joint 173 and relatively rotates the second arm 13 and the third arm 14. The motor M4 is provided inside of the joint 174 and relatively rotates the third arm 14 and the fourth arm 15. The motor M5 is provided inside of the joint 175 and relatively rotates the fourth arm 15 and the fifth arm 16. The motor M6 is provided inside of the joint 176 and relatively rotates the fifth arm 16 and the sixth arm 17.

Further, the encoder E1 is provided inside of the joint 171 and detects the position of the motor M1. The encoder E2 is provided inside of the joint 172 and detects the position of the motor M2. The encoder E3 is provided inside of the joint 173 and detects the position of the motor M3. The encoder E4 is provided inside of the joint 174 and detects the position of the motor M4. The encoder E5 is provided inside of the joint 175 and detects the position of the motor M5. The encoder E6 is provided inside of the joint 176 and detects the position of the motor M6.

The encoders E1 to E6 are electrically coupled to the control apparatus 3 and position information, i.e., amounts of rotation of the motor M1 to motor M6 are transmitted to the control apparatus 3 as electrical signals. Then, the control apparatus 3 drives the motor M1 to motor M6 via motor drivers (not shown) based on the information. That is, to control the robot arm 10 is to control the motor M1 to motor M6.

A control point CP is set at the distal end of the robot arm 10. The control point CP refers to a point as a reference for control of the robot arm 10. In the robot system 100, the position of the control point CP is acquired in a robot coordinate system and the robot arm 10 is driven to move the control point CP to a desired position.

Further, in the robot 1, a force detection unit 19 that detects a force is detachably placed in the robot arm 10. The robot arm 10 may be driven with the force detection unit 19 placed therein. The force detection unit 19 is a six-axis force sensor in the embodiment. The force detection unit 19 detects magnitude of forces on three detection axes orthogonal to one another and magnitude of torque about the three detection axes. That is, the unit detects force components in the respective axial directions of the X-axis, the Y-axis, the Z-axis orthogonal to one another, a force component in a W direction about the X-axis, a force component in a V direction about the Y-axis, and a force component in a U direction about the Z-axis. Note that, in the embodiment, the Z-axis direction is the vertical directions. The force components in the respective axial directions may be referred to as "translational force components" and the force components about the respective axes may be referred to as "torque components". The force detection unit 19 is not limited to the six-axis force sensor, but may have another configuration.

In the embodiment, the force detection unit 19 is placed in the sixth arm 17. Note that the placement position of the force detection unit 19 is not particularly limited to the sixth arm 17, i.e., the arm located at the most distal end side, but may be in the other arm or between the adjacent arms, for example.

The end effector 20 may be detachably attached to the force detection unit 19. In the embodiment, the end effector 20 is a polisher that polishes the workpiece W1 and the workpiece W2 as the working objects. The polisher has a polishing member 21 having abrasive grain in the outer circumferential portion, a motor (not shown) that rotates the polishing member 21, and a power supply (not shown) that drives the motor. In the robot coordinate system, a tool center point TCP is set in an arbitrary position, preferably, at the center on the distal end surface of the polishing member 21. Note that the tool center point TCP is not limited thereto and may be set in the outer circumferential portion of the polishing member 21.

As described above, in the robot system 100, the position of the control point CP is acquired in the robot coordinate system and the robot arm 10 is driven to move the control point CP to a desired position. The type, particularly, the length of the end effector 20 is acquired, and thereby, an offset amount between the tool center point TCP and the control point CP may be acquired. Accordingly, the position of the tool center point TCP may be acquired in the robot coordinate system. Therefore, the tool center point TCP may be used as a reference for the control. That is, to control the position of the control point CP is to control the position of the tool center point TCP. Further, as will be described later, to store the position of the tool center point TCP is to store the position of the control point CP.

When work is performed on the workpiece W1 and the workpiece W2, in the end effector 20, at least the position of the tool center point TCP is in contact with the workpiece W1 and the workpiece W2.

In the embodiment, the end effector 20 is the polisher, but not limited to that in the present disclosure. The end effector may be e.g. a grinder, a cutter, or the like, a tool such as a driver or a wrench, or a hand that grips the workpiece W1 and the workpiece W2 by suction or nipping.

Further, in the embodiment, as shown in FIGS. 1 and 3, the workpiece W1 and the workpiece W2 will be explained as members formed in elongated bodies having circular cross-sectional surface shapes and two curved middle parts in the longitudinal directions.

The workpiece W1 and the workpiece W2 are working objects of the same type. Here, "working objects of the same type" include not only a case where the entire shapes are the same but also a case where dimensions of the working object parts are the same, but the shapes of the other parts than the working object parts are different. Further, "the dimensions are the same" refer to cases where the dimension error in comparison between the same parts is equal to or less than 1 mm.

The robot 1 performs work of the same type on the workpiece W1 and the workpiece W2. The work performed by the robot includes polishing, grinding, cutting, and assembly. "Work of the same type" refers to work in these same categories using the same tools.

Next, the control apparatus 3 and the teaching apparatus 4 will be explained.

The control apparatus 3 as a control unit is placed apart from the robot 1 and includes a computer having a CPU (Central Processing Unit) as an example of a processor provided therein. The control apparatus 3 may be provided inside of the base 11 of the robot 1.

The control apparatus 3 is communicably connected to the robot 1 by the relay cable 18. The control apparatus is coupled to the teaching apparatus 4 by a cable or communicably in wireless connection. The teaching apparatus 4 may be a dedicated computer or a general-purpose computer in which programs for teaching the robot 1 are installed. For example, a teaching pendant as a dedicated device for teaching the robot 1 or the like may be used in place of the teaching apparatus 4. Or, the control apparatus 3 and the teaching apparatus 4 may have separate housings or may be integrally formed.

In the teaching apparatus 4, a program for generating an execution program having a target position $S_t$ and a target force $f_{St}$, which will be described later, as parameters in the control apparatus 3 and loading the program in the control apparatus 3 may be installed. The teaching apparatus 4 includes a display 41, a processor, a RAM, and a ROM, and these hardware resources generate the execution program in cooperation with a teaching program.

As shown in FIG. 2, the control apparatus 3 is a computer in which a control program for control of the robot is installed. The control apparatus 3 includes a processor and a RAM and a ROM (not shown), and these hardware resources control the robot 1 in cooperation with the program.

Further, as shown in FIG. 2, the control apparatus 3 has a target position setting section 3A, a drive control section 3B, and a memory section 3C. The memory section 3C includes e.g. a volatile memory such as a RAM (Random Access Memory), a nonvolatile memory such as a ROM (Read Only Memory), and a detachable external memory device. In the memory section 3C, operation programs for actuation of the robot 1 including a program for execution of the control method for the robot according to the present disclosure, information on the shapes of the workpiece W1 and the workpiece W2, and positions in which the workpiece W1 and the workpiece W2 are placed in the robot coordinate system are stored. Further, first position information, second position information, etc., which will be described later, are stored in the memory section 3C.

The target position setting section 3A sets the target position $S_t$ and a route plan for execution of predetermined work on the workpiece W1 and the workpiece W2.

First, the target position setting section 3A acquires information on the shapes of the workpiece W1 and the workpiece W2 and positions in which the workpiece W1 and the workpiece W2 are placed in the robot coordinate system from the memory section 3C. Note that the information stored in the memory section 3C may be obtained from e.g. three-dimensional data input by a worker using the teaching apparatus 4 or obtained from image data by imaging of the workpiece W1 and the workpiece W2 using an imaging device (not shown).

Then, as shown in FIG. 4, the target position setting section 3A sets target positions $S_t$ for the workpiece W1 in the robot coordinate system. As shown in FIGS. 5 and 6, a plurality of the target positions $S_t$ are set in positions deeper from the outer surface, i.e., inside of the workpiece W1. The target positions $S_t$ are set as described above, and thereby, the end effector 20 and the workpiece W1 may be brought into contact more reliably and more accurate work may performed at first work, which will be described later.

Further, the target position setting section 3A sets the respective target positions $S_t$ at predetermined intervals. These intervals may be the same or partially different. These intervals may be set in advance or set by the worker using the teaching apparatus 4.

Then, the order in which the control point CP or the tool center point TCP of the robot arm 10 moves with respect to each target position $S_t$ is set. That is, the motion path of the robot arm 10 is set. For example, the motion path is a path from the first target position $S_t$ as a work start position sequentially passing through the adjacent target positions $S_t$. Note that the motion path may be set in advance or set by the worker using the teaching apparatus 4. "The control point CP or the tool center point TCP of the robot arm 10 moves with respect to the target position $S_t$," refers to movement of the control point CP or the tool center point TCP toward the target position $S_t$ as a target, not necessarily into the target position $S_t$.

The work start position may be set according to the position in which the workpiece W1 is actually placed, the posture of the robot arm 10, i.e., the position of the control point CP. For example, the target position $S_t$ closest to the control point CP may be set as the work start position.

Note that, when the order in which the control point CP or the tool center point TCP of the robot arm 10 moves with respect to each target position $S_t$ is set, postures of the robot arm 10 approaching the respective target positions $S_t$ are also set. That is, when the order is set with respect to each target position $S_t$, a direction and a posture in which the robot arm approaches each target position $S_t$ are associated and stored in the memory section 3C.

The drive control section 3B controls driving of the robot arm 10 and has a position control unit 30, a coordinate transformation unit 31, a coordinate transformation unit 32, a correction unit 33, a force control unit 34, and a command integration unit 35.

The position control unit 30 generates a position command signal for controlling the position of the tool center point TCP of the robot 1 according to a position designated by a command created in advance. That is, the position control unit 30 generates a position command value P for movement of the tool center point TCP with respect to each target position $S_t$.

Here, the control apparatus 3 can control motion of the robot 1 by force control or the like. "Force control" refers to control of the motion of the robot 1 to change the position of the end effector 20, i.e., the position of the tool center point TCP and the postures of the first arm 12 to sixth arm 17 based on the detection result of the force detection unit 19.

The force control includes e.g. force trigger control and impedance control. In the force trigger control, force detection is performed by the force detection unit 19, and the robot arm 10 is moved and changed in posture until a predetermined force is detected by the force detection unit 19.

The impedance control includes profile control. First, in brief explanation, in the impedance control, the motion of the robot arm 10 is controlled so that the force applied to the distal end portion of the robot arm 10 may be maintained as equal to the predetermined force as possible, that is, a force in a predetermined direction detected by the force detection unit 19 may be maintained as equal to the target force $f_{St}$ as possible. Thereby, for example, when the impedance control is performed on the robot arm 10, the robot arm 10 performs motion profiling an external force applied by an object or an operator with respect to the predetermined direction. Note that the target force $f_{St}$ includes zero. For example, in a case of the profiling motion, the target value may be set to "0". The target force $f_{St}$ may be set to another numerical value than zero. The target force $f_{St}$ can be appropriately set by the worker.

The memory section 3C stores correspondence relationships between combinations of the rotation angles of the motor M1 to motor M6 and the positions of the tool center point TCP in the robot coordinate system. Further, the control apparatus 3 stores at least one of the target position $S_t$ and the target force $f_{St}$ for each step of the work performed by the robot 1 according to the command in the memory section 3C. The command having the target position $S_t$ and the target force $f_{St}$ as parameters are set for each step of the work performed by the robot 1.

The drive control section 3B controls the first arm 12 to sixth arm 17 according to the command so that the set target position $S_t$ and target force $f_{St}$ may coincide at the tool center point TCP. The target force $f_{St}$ refers to a force to be detected by the force detection unit 19 in response to the motion of the first arm 12 to sixth arm 17. Here, the character expresses one direction of directions of the axes (X, Y, Z, U, V, W) defining the robot coordinate system. Further, "S" also expresses a position in an S direction. For example, when S=X, an X direction component of the target position set in the robot coordinate system is $S_t=X_t$, and an X direction component of the target force is $f_{St}=f_{Xt}$.

In the drive control section 3B, when the rotation angles of the motor M1 to motor M6 are acquired, the coordinate transformation unit 31 shown in FIG. 2 transforms the rotation angles into the position S (X, Y, Z, U, V, W) of the tool center point TCP in the robot coordinate system based on the correspondence relationship. Then, the coordinate transformation unit 32 specifies an acting force $f_S$ actually acting on the force detection unit 19 in the robot coordinate system based on the position S of the tool center point TCP and the detection value of the force detection unit 19.

The point of application of the acting force $f_S$ is defined as the origin separate from the tool center point TCP. The origin corresponds to a point at which the force detection unit 19 detects the force. Note that the control apparatus 3 stores a correspondence relationship defining directions of detection axes in a sensor coordinate system of the force detection unit 19 with respect to each position S of the tool center point TCP in the robot coordinate system. Therefore, the control apparatus 3 may specify the acting force $f_S$ in the robot coordinate system based on the correspondence relationship with the position S of the tool center point TCP in the robot coordinate system. Further, torque acting on the robot may be calculated from the acting force $f_S$ and a distance from a contact point to the force detection unit 19 and is specified as a torque component. Note that, when the end effector 20 performs work in contact with the workpiece W1 and the workpiece W2, the contact point may be regarded as the tool center point TCP.

The correction unit 33 performs gravity compensation on the acting force $f_S$. The gravity compensation refers to removal of components of a force and torque caused by the gravity force from the acting force $f_S$. The gravity-compensated acting force $f_S$ may be regarded as another force than the gravity force acting on the robot arm 10 or the end effector 20.

Further, the correction unit 33 performs inertia compensation on the acting force $f_S$. The inertia compensation refers to removal of components of a force and torque caused by the inertial force from the acting force fs. The inertia-compensated acting force $f_S$ may be regarded as another force than the inertial force acting on the robot arm 10 or the end effector 20.

The force control unit 34 performs impedance control. The impedance control is active impedance control that realizes virtual mechanical impedance using the motor M1 to motor M6. The control apparatus 3 executes the impedance control in processes under contact conditions in which forces are applied to the end effector 20 from workpieces as objects including fitting work, screwing work, polishing work of the workpieces and for direct teaching. Even in another case than the above described processes, for example, the impedance control is performed when a human contacts the robot 1, and thereby, safety may be increased.

In the impedance control, the target force $f_{St}$ is substituted into the equation of motion, which will be described later, and the rotation angles of the motor M1 to motor M6 are derived. The signals for controlling the motor M1 to motor M6 by the control apparatus 3 are PWM (Pulse Width Modulation)-modulated signals.

In a non-contact process in which no external force is applied to the end effector 20, the control apparatus 3 controls the motor M1 to motor M6 at the rotation angles derived by linear calculation from the target positions $S_t$. A mode in which the motor M1 to motor M6 are controlled at the rotation angles derived by linear calculation from the target positions $S_t$ is referred to as "position control mode".

The control apparatus 3 specifies a force-derived correction amount $\Delta S$ by substitution of the target force $f_{St}$ and the acting force $f_S$ into the equation of motion of the impedance control. The force-derived correction amount $\Delta S$ refers to magnitude of the position S to which the tool center point TCP should move to resolve a force deviation $\Delta f_S(t)$ from the target force $f_{St}$ when the tool center point TCP is subjected to mechanical impedance. The following Equation (1) is the equation of motion of the impedance control.

$$m\Delta\ddot{S}(t)+d\Delta\dot{S}(t)+k\Delta S(t)=\Delta f_S(t) \quad (1)$$

The left side of Equation (1) is formed by the first term in which the second-order differential value of the position S of the tool center point TCP is multiplied by a virtual mass coefficient m (hereinafter, referred to as "mass coefficient m"), the second term in which the differential value of the position S of the tool center point TCP is multiplied by a virtual viscosity coefficient d (hereinafter, referred to as "viscosity coefficient d"), and the third term in which the position S of the tool center point TCP is multiplied by a virtual elastic coefficient k (hereinafter, referred to as "elastic coefficient k"). The right side of Equation (1) is formed by the force deviation $\Delta f_S(t)$ obtained by subtraction of the real force f from the target force $f_{St}$. The differential in Equation (1) refers to time differential. In a process performed by the robot 1, a constant value may be set as the target force $f_{St}$ or a time function may be set as the target force $f_{St}$.

The mass coefficient m refers to a mass that the tool center point TCP virtually has, the viscosity coefficient d refers to a viscous resistance to which the tool center point TCP is virtually subjected, and the elastic coefficient k refers to a spring constant of an elastic force to which the tool center point TCP is virtually subjected.

The larger the value of the mass coefficient m, the lower the acceleration of the motion, and the smaller the value of the mass coefficient m, the higher the acceleration of the motion. The larger the value of the viscosity coefficient d, the lower the velocity of the motion, and the smaller the value of the viscosity coefficient d, the higher the velocity of the motion. The larger the value of the elastic coefficient k, the higher the spring property, and the smaller the value of the elastic coefficient k, the lower the spring property.

In this specification, the respective mass coefficient m, viscosity coefficient d, and elastic coefficient k are referred to as "force control parameters". These mass coefficient m, viscosity coefficient d, and elastic coefficient k may be set to different values with respect to each direction or set to common values regardless of the directions. Further, the mass coefficient m, the viscosity coefficient d, and the elastic coefficient k can be appropriately set by the worker before work.

As described above, in the robot system 100, the force-derived correction amount $\Delta S$ is obtained from the detection value of the force detection unit 19, the preset force control parameters, and the preset target force. The force-derived correction amount $\Delta S$ refers to a difference between the position in which the external force is applied and the position to which the tool center point TCP should be moved.

Then, the command integration unit 35 adds the force-derived correction amount $\Delta S$ to the position command value P generated by the position control unit 30. The addition is performed as necessary, and thereby, the command integration unit 35 obtains a position command value P' as a new position command value from the position command value P used for movement to the position in which the external force is applied. Note that the position command value P refers to a command value for moving the tool center point TCP to the target position $S_t$.

Then, the coordinate transformation unit 31 transforms the position command value P' into the robot coordinates, and an execution part 351 executes, and thereby, the tool center point TCP is moved to the position in consideration of the force-derived correction amount $\Delta S$ and the impact by the application of the external force may be relaxed, and the more load applied to the object in contact with the robot 1 may be relaxed.

Here, in the force control, to maintain the force in the predetermined direction detected by the force detection unit 19 as equal to the target force $f_{St}$ as possible, it is necessary to make the motion velocity of the robot arm 10 lower. Particularly, to bring the end effector 20 and the workpiece W1 into contact more reliably, as shown in FIGS. 5 and 6, the target positions $S_t$ are set in positions deeper from the outer surface, i.e., inside of the workpiece W1. Accordingly, the position in which the end effector 20 and the workpiece W1 actually come into contact is different. It is necessary to set the motion velocity of the robot arm 10 to be lower until the end effector 20 and the workpiece W1 come into contact to avoid an excessive load applied to the workpiece W1 for contact in any time. Accordingly, as shown in FIG. 8, when an amount of difference D between the position in which the end effector 20 and the workpiece W1 actually come into contact and the target position $S_t$ is larger, it is necessary to further decrease the motion velocity of the robot arm 10 and the working time becomes longer. Particularly, when work is performed on a plurality of workpieces, the accumulated working time becomes longer. On the other hand, in the present disclosure, the accumulated working time may be shortened in the following manner.

Hereinafter, the target position $S_t$ set for the workpiece W1 is referred to as "target position $S_{t1}$" and the target position $S_t$ set for the workpiece W2 is referred to as "target position $S_{t2}$". Further, the work on the workpiece W1 is referred to as "first work" and the work on the workpiece W2 is referred to as "second work".

In the robot system 100, when the first work is performed, the target position setting section 3A sets the plurality of target positions $S_t$ in the positions deeper from the outer surface, i.e., inside of the workpiece W1 as shown in FIGS. 5 and 6. As described above, this is for more reliable contact between the end effector 20 and the workpiece W1 when the robot arm 10 is driven by the force control.

When the end effector 20 is moved toward the target position $S_{t1}$ as a work start position and the end effector 20 and the workpiece W1 come into contact, the force detection unit 19 detects the reaction force from the workpiece W1. Then, the above described force control is performed so that the reaction force may be equal to the target force $f_{St}$. Then, the robot arm 10 is driven so that the tool center point TCP may move toward the target positions $S_{t1}$ in the preset order while the robot arm 10 is driven by the force control, and thereby, the first work is performed.

In each target position $S_{t1}$, a position in which the amount of difference D is cancelled from the target position $S_{t1}$, i.e., the position in which the work is actually performed is stored in the memory section 3C. That is, a trajectory in which the tool center point TCP passes in the first work is stored in the memory section 3C. The trajectory refers to a collection of points at which the tool center point TCP moves. The intervals and times to store are not particularly limited, however, in the embodiment, the trajectory is stored with respect to each target position $S_{t1}$.

After the first work is completed, the process moves to the second work. When the first work is completed, the worker or the robot arm 10 may transport the workpiece W2 to the same position as that of the workpiece W1, or, as shown in FIG. 1, work may be sequentially performed in different positions. In this case, in consideration of the position differences of the workpiece W1 and the workpiece W2, the target positions $S_{t1}$ and the target positions $S_{t2}$ are respectively set.

Then, when the target positions $S_{t2}$ are set for the workpiece W2, the position command value P for the robot arm 10 is updated based on the first position information stored in the memory section 3C. Specifically, as shown in FIG. 9, the first position information on the actual movement of the tool center point TCP in the first work is set as the target positions $S_{t2}$. Then, the position command value P corresponding to the target positions $S_{t2}$ is updated and an updated value is calculated. That is, the updated value refers to the updated position command value P. The second work is executed by the force control based on the updated value. Thereby, the target positions $S_{t2}$ in the second work may be shifted toward the outer surface side than the target positions $S_{t1}$ in the first work. That is, the force control may be performed using the positions in which the tool center point TCP actually passed in the first work as the target positions. Therefore, the amount of difference D in the second work may be made smaller than that in the first work and, in the second work, the motion velocity of the robot arm 10 may be made higher than that in the first work. As a result, the second work may be quickly performed and the accumulated working time may be shortened.

As described above, the robot system 100 according to the present disclosure includes the robot arm 10 that performs the first work on the workpiece W1 as the first working object and performs the second work of the same type as the first work on the workpiece W2 as the second working object of the same type as the workpiece W1, and the control apparatus 3 as the control unit having the memory section 3C and controlling the operation of the robot arm 10. Further, the control apparatus 3 executes the first work on the workpiece W1 by operating the robot arm 10 by the force control based on the predetermined position command value, stores the first position information of the trajectory in which the control point CP set for the robot arm 10 passes in the first work, updates the position command value for the robot arm 10 based on the stored first position information, and executes the second work on the workpiece W2 by operating the robot arm by the force control based on the updated value as the updated position command value P. Thereby, in the second work, the amount of difference D between the position in which the end effector 20 and the workpiece W1 actually come into contact and the target position $S_t$ may be made smaller than that in the first work. Therefore, in the second work, the motion velocity of the robot arm 10 may be made higher than that in the first work. As a result, the second work may be quickly performed and the accumulated working time may be shortened.

Next, the explanation will be made with reference to flowcharts shown in FIGS. 10 and 11. First, the work on the workpiece W1 is explained using the flowchart shown in FIG. 10.

First, at step S101, the target positions $S_{t1}$ are set for the workpiece W1. The target positions $S_{t1}$ are located in the positions deeper from the outer surface, i.e., inside of the workpiece W1. Further, at this step, the order of passing through the respective target positions $S_{t1}$ is also set.

Then, at step S102, the first work is started by the force control and sequential trajectory planning processing is performed. By the sequential trajectory planning processing, the position command value P of the arm according to the trajectory generated in the trajectory planning is calculated and the robot arm 10 is driven by the force control.

At step S103, the force-derived correction amount ΔS is added to the position command value P and the position command value P' is calculated. That is, the force-derived correction amount ΔS is calculated according to the detection value detected by the force detection unit 19, i.e., the reaction force applied from the workpiece W1, added to the position command value P, and the new position command value P' is obtained.

Then, at step S104, the position command value P' calculated at step S103 is stored. That is, in the first work, the trajectory in which the tool center point TCP passed, i.e., the first position information is stored in the memory section 3C.

Then, at step S105, the position command value P' calculated at step S103 is transmitted to the robot arm 10. Thereby, the first work may be performed without an excessive load on the workpiece W1.

Then, at step S106, whether or not the movement to all of the target positions $S_{t1}$ as targets is completed is determined. When a determination that the movement is not completed is made, the process returns to step S102 and the subsequent steps are sequentially repeated.

In the above described first work, step S102, step S103, and step S105 are a first working step. Further, step S104 is a first memory step. Note that, in the embodiment, the first working step and the first memory step are performed in parallel, however, the present disclosure is not limited to that. The first working step and the first memory step may be sequentially performed. That is, step S104 may be performed after step S102, step S103, and step S105 are completed.

Next, the second work will be explained.

First, at step S201, data at the first work is read and the target positions are set. That is, the first position information stored at step S104 in the first work is read and set as the target positions $S_{t2}$. In other words, the positions to which the tool center point TCP moves in the first work are set as the target positions $S_{t2}$.

Then, at step S202, the second work is started by the force control and the sequential trajectory planning processing is performed. At this step, the position command value is updated based on the first position information and the force control is performed based on the updated value. Thereby, the motion velocity of the robot arm 10 may be made higher than that in the first work.

Then, at step S203, whether or not the detection value detected by the force detection unit 19, i.e., the reaction force applied from the workpiece W1 exceeds a predetermined value is determined. The predetermined value here is a threshold value of magnitude of the detected force and stored in the memory section 3C in advance.

At step S203, when a determination that the detection value detected by the force detection unit 19 does not exceed the predetermined value is made, step S204, step S205, step S206, and step S207 are sequentially performed. These steps are substantially the same as step S103 to step S106 in the first work, and the explanation thereof will be omitted. Note that step S206 is a second memory step.

At step S203, when a determination that the detection value detected by the force detection unit 19 exceeds the predetermined value is made, at step S205, the motion velocity of the robot arm 10 is adjusted.

As the step S205, there are the following two patterns.

In the first pattern, at the second working step, when the force applied to the robot arm 10 exceeds the predetermined value, the motion velocity of the control point CP is made lower and the robot arm 10 is operated. Thereby, in the second work, even when the motion velocity is made higher than that in the first work, an excessive load on the workpiece W2 may be prevented or suppressed. Further, the second work is not stopped and productivity may be increased.

In the second pattern, at the second working step, when the force applied to the robot arm 10 exceeds the predetermined value, the motion of the robot arm 10 is stopped. Thereby, in the second work, even when the motion velocity is made higher than that in the first work, an excessive load on the workpiece W2 may be prevented or suppressed. Further, the motion is stopped and safety may be further increased.

Note that, in the second pattern, the work may be restarted according to e.g. an instruction from the worker.

In the above described second work, step S202, step S203, step S204, step S205, step S207, and step S208 are a second working step. Further, step S206 is the second memory step. Note that, in the embodiment, the second working step and the second memory step are performed in parallel, however, the present disclosure is not limited to that. The second working step and the second memory step may be sequentially performed. That is, step S206 may be performed after step S202, step S203, step S204, step S205, step S207, and step S208 are completed.

As described above, the control method for the robot according to the present disclosure is the control method for the robot having the robot arm 10 that performs the first work on the workpiece W1 as the first working object and performs the second work of the same type as the first work on the workpiece W2 as the second working object of the same type as the workpiece W1. Further, the control method for the robot has the first working step of executing the first work on the first working object by operating the robot arm 10 by the force control based on the predetermined position command value, the first memory step of storing the first position information of the trajectory in which the control point CP set for the robot arm 10 passes at the first working step, and the second working step of updating the position command value for the robot arm 10 based on the first position information stored at the first memory step and executing the second work on the workpiece W2 by operating the robot arm 10 by the force control based on the updated value as the updated position command value P. Thereby, in the second work, the amount of difference D between the position in which the end effector 20 and the workpiece W1 actually come into contact and the target position $S_t$ may be made smaller than that in the first work. Therefore, in the second work, the motion velocity of the robot arm 10 may be made higher than that in the first work. As a result, the second work may be quickly performed and the accumulated working time may be shortened.

The first work and the second work are continuously performed. In other words, the first work is work immediately before the second work. Further, in other words, the robot 1 executes the second work after the first work without performing other work. The first work and the second work have the relationship and the accumulated working time may be effectively shortened.

Or, after the second working step is completed, third work (not shown) may be performed on another workpiece of the same type than the workpiece W1 or the workpiece W2. That is, according to the number of workpieces, a third working step or the subsequent steps may be performed. In this case, at the third working step, it is preferable that the position command value P for the robot arm is updated based on an average value of the first position information and the second position information, and the third work is performed by operating the robot arm based on the updated value.

As described above, the control method for the robot according to the present disclosure has the second memory step of storing the second position information of the trajectory in which the control point CP passes at the second working step, and the third working step of updating the position command value P for the robot arm based on the average value of the first position information and the second position information, and performing the third work by operating the robot arm 10 based on the updated value as the position command value P updated based on the average value. Thereby, in comparison with the related art, the accumulated working time may be further shortened. Further, at the third working step, the updated value of the position command value is obtained based on the average value of the first position information and the second position information, and thus, work may be performed in consideration of the past trend. As a result, the work may be performed more quickly and accurately.

Note that, at the third working step, the updated value of the position command value P may be calculated based on the second position information. That is, the updated value of the position command value P may be calculated based on the position information in the last work.

Further, in the second work, the number of target positions $S_{t2}$ may be made smaller than the number of target positions $S_{t1}$ in the first work, that is, thinned. Thereby, the motion velocity of the robot arm 10 may be further increased and the work may be performed more quickly.

In the second work, both the force control and the position control may be performed. For example, the work may be performed by the force control on a part having a complex surface shape of the workpiece W2 and the work may be performed by the position control on a part having a simple surface shape of the workpiece W2. Thereby, the work may be performed more quickly without deterioration in work quality.

Second Embodiment

Figure 12:
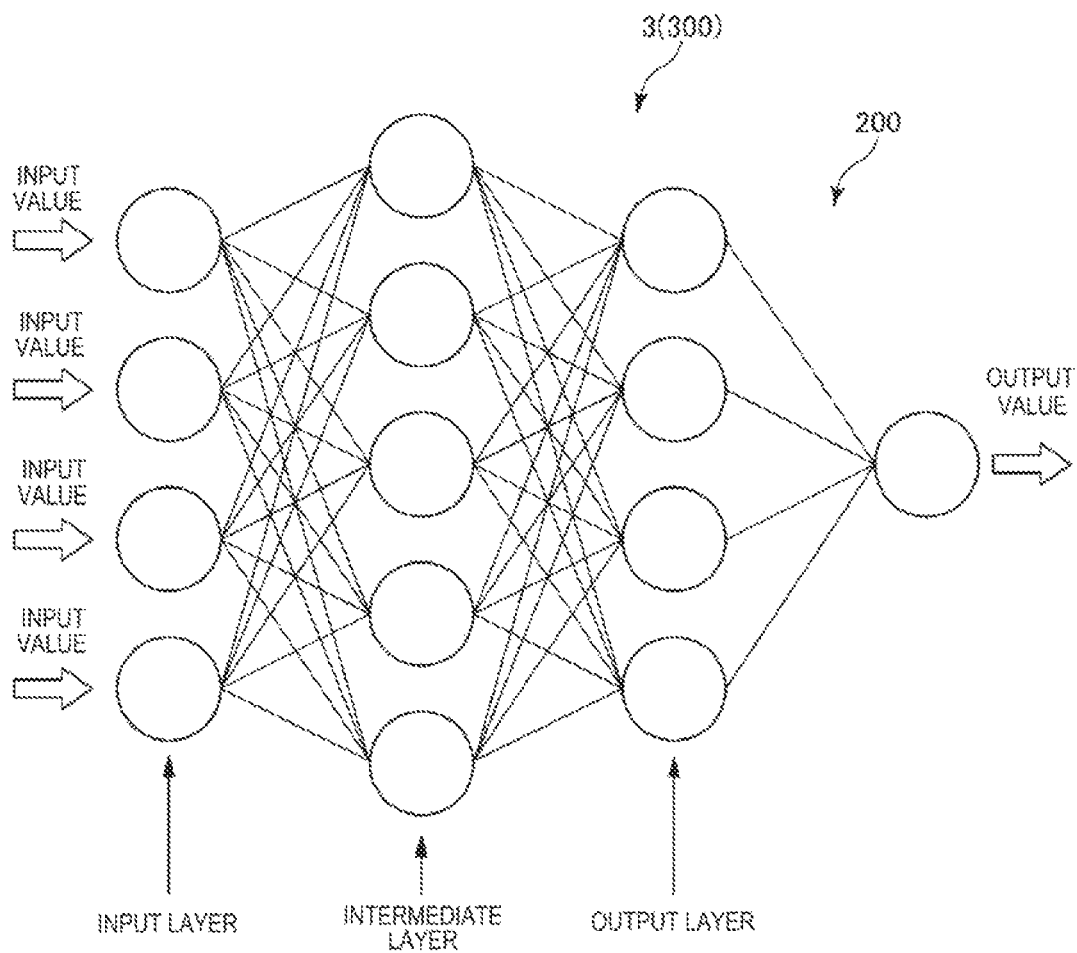
FIG. 12 is a conceptual diagram of a learning model generated by a control apparatus of a robot system of a second embodiment.

FIG. 12 is a conceptual diagram of a learning model generated by a control apparatus of a robot system of a second embodiment.

As below, the second embodiment of the control method for the robot and the robot system according to the present disclosure will be explained with reference to FIG. 12 with a focus on the differences from the above described embodiment, and the explanation of the same items will be omitted.

As shown in FIG. 12, the control apparatus 3 has a model creation unit 300 that creates a learning model 200 by machine learning. Note that, to create the learning model 200 by machine learning is to create the learning model 200 by iteratively learning from input data, finding features, tendencies, etc. read from the respective input data, and applying the results to new input data for prediction.

The learning model 200 refers to a model of receiving an input value, performing an evaluation and a determination, and outputting a result thereof as an output value. The input value is the positions in which the control point CP actually passed, i.e., the position command value in the previous work and the forces applied to the robot arm 10, and the output value is an updated value of the position command value.

The model creation unit 300 may be constructed using e.g. a recurrent neural network as shown in FIG. 12. Specifically, the model creation unit 300 may have an input layer, an intermediate layer, and an output layer. Each information connects to information of the adjacent layers via networks and a larger network is developed. The intermediate layer has a single layer in the illustrated configuration, but preferably has a plurality of layers. Thereby, in the respective layers of the intermediate layer, importance of information may be weighted and the target positions may be set more accurately.

In the recurrent neural network, the network may be constructed by replacement of the information of the intermediate layer at the previous time by information of the intermediate layer at this time. Therefore, the network in consideration of the chronological information may be constructed. As a result, the target positions may be set more accurately.

A learning method in the model creation unit 300 includes supervised learning, unsupervised learning, and a combination thereof. In a case of the supervised learning, the target positions may be set more accurately by reflection of the output value or a pass/fail result thereof on the input value. In a case of the unsupervised learning, a large number of data sets of the input value and the output value are prepared and provided to the model creation unit 300, and thereby, the features in those data sets may be learned and a model for estimation of a result from the input, i.e., a relationship thereof may be inductively gained. Therefore, even when information on the determination of pass/fail of the target positions is not provided, the target positions may be accurately set. As a result, the work may be performed more quickly and accurately. For example, error backpropagation is applied to the recurrent neural network, and thereby, unsupervised learning can be performed and the target positions may be accurately set.

As described above, the control apparatus 3 as the control unit creates the learning model 200 having the position command value for the robot arm 10 and the force applied to the robot arm 10 as input and the updated value as output. Thereby, the updated value may be output in consideration of trends that the positions in which the control point CP passed in the previous work and the forces applied to the robot arm 10. Therefore, the target positions may be set more accurately.

Other Configuration Examples of Robot System

Figure 13:
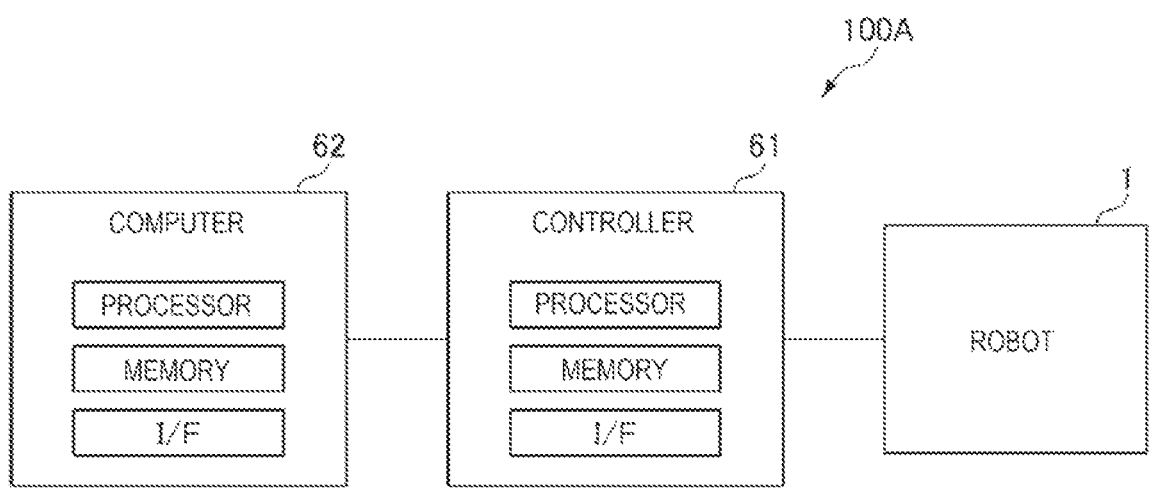
FIG. 13 is a block diagram for explanation of the robot system with a focus on hardware.

FIG. 13 is a block diagram for explanation of the robot system with a focus on hardware.

FIG. 13 shows an overall configuration of a robot system 100A in which the robot 1, a controller 61, and a computer 62 are coupled. The control of the robot 1 may be executed by reading of a command in a memory using a processor in the controller 61 or executed by reading of a command in a memory using a processor in the computer 62 via the controller 61.

Therefore, one or both of the controller 61 and the computer 62 may be regarded as "control apparatus".

Modified Example 1

Figure 14:
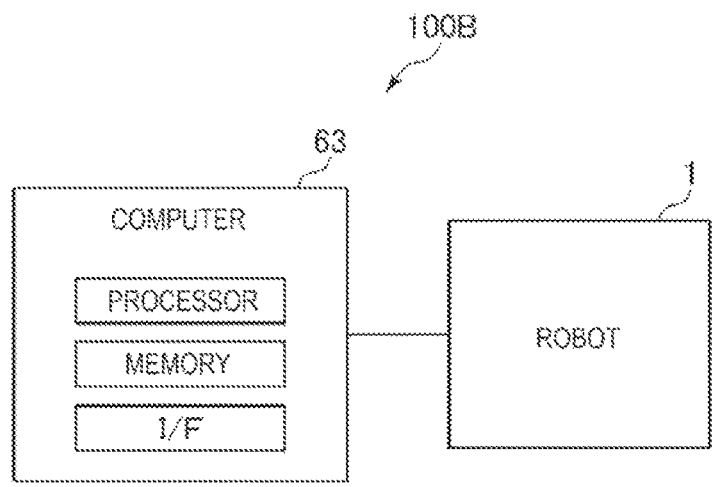
FIG. 14 is a block diagram showing modified example 1 with a focus on hardware of the robot system.

FIG. 14 is a block diagram showing modified example 1 with a focus on hardware of the robot system.

FIG. 14 shows an overall configuration of a robot system 100B in which a computer 63 is directly coupled to the robot 1. The control of the robot 1 is directly executed by reading of a command in a memory using a processor in the computer 63.

Therefore, the computer 63 may be regarded as "control apparatus".

Modified Example 2

Figure 15:
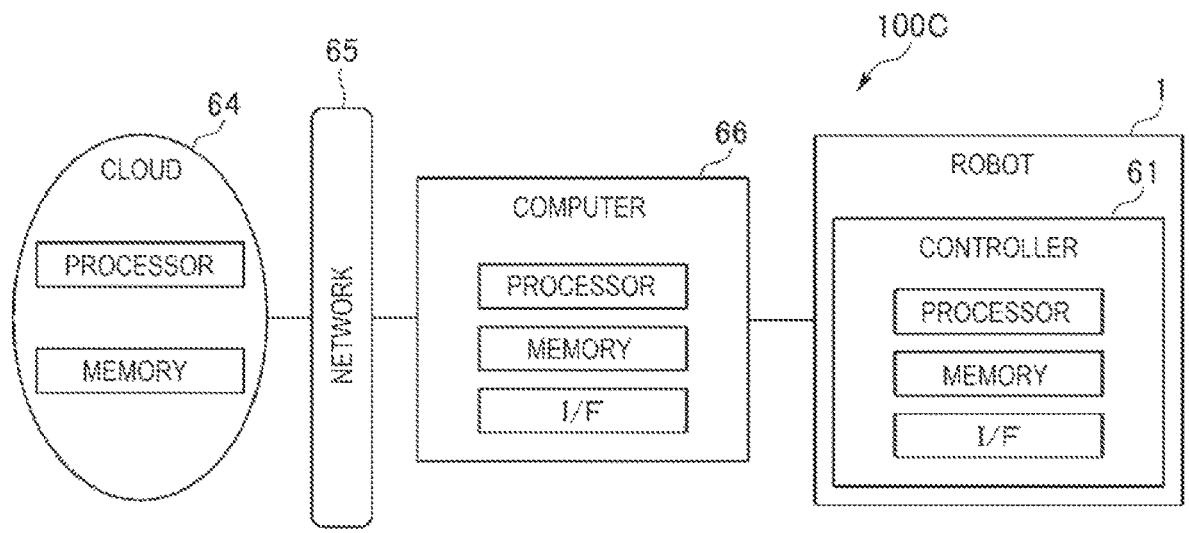
FIG. 15 is a block diagram showing modified example 2 with a focus on hardware of the robot system.

FIG. 15 is a block diagram showing modified example 2 with a focus on hardware of the robot system.

FIG. 15 shows an overall configuration of a robot system 100C in which the robot 1 containing the controller and a computer 66 are coupled and the computer 66 is coupled to a cloud 64 via a network such as a LAN. The control of the robot 1 may be executed by reading of a command in a memory using a processor in the computer 66, or executed by reading of a command in a memory via the computer 66 using a processor on the cloud 64.

Therefore, one, two, or three of the controller 61, the computer 66, and the cloud 64 may be regarded as "control apparatus".

As above, the control method for the robot and the robot system according to the present disclosure are explained with respect to the illustrated embodiments, however, the present disclosure is not limited to the embodiments. The respective parts forming the robot system may be replaced by arbitrary configurations that may exert the same functions. Further, an arbitrary configuration may be added thereto.

What is claimed is:

1. A control method for a robot having a robot arm that performs first work on a first working object and performs second work of a same type as the first work on a second working object of a same type as the first working object, comprising:
    obtaining first information relating to configurations of the first and second working objects and positions of the first and second working objects within a robot coordinate system from a memory;
    setting a plurality of initial target positions with respect to the first working object within the robot coordinate system based on the first information, the first working object being in a three-dimensional shape having a first outer periphery and a first inside interior of the first outer periphery, the plurality of initial target positions being located at the first inside interior of the first working object;
    setting an initial target trajectory along which a control point on the robot arm passes such that a tool center point of a tool attached to the robot arm passes through the plurality of initial target positions;
    executing the first work on the first working object by operating the robot arm with force control based on the set initial target trajectory;
    detecting a first actual trajectory along which the control point passes during the execution of the first work on the first working object with the force control;
    storing the first actual trajectory into the memory;
    setting a plurality of first updated target positions with respect to the second working object based on the first actual trajectory, the second working object being in a three-dimensional shape having a second outer periphery and a second inside interior of the second outer periphery, the plurality of first updated target positions being located on the second outer periphery of the second work object; and
    executing the second work on the second working object by operating the robot arm with the force control based on the set plurality of first updated target positions.

2. The control method for the robot according to claim 1, wherein
    when a force applied to the robot arm exceeds a predetermined value, a motion velocity of the control point is reduced while the robot arm is operated.

3. The control method for the robot according to claim 2, wherein
    when the force applied to the robot arm exceeds the predetermined value, motion of the robot arm is stopped.

4. The control method for the robot according to claim 1, further comprising:
    detecting a second actual trajectory along which the control point passes during the execution of the second work on the second working object with the force control;
    storing the second actual trajectory into the memory;
    obtaining an average value of the first and second actual trajectories; and
    executing third work by operating the robot arm with the force control based on the average value.

5. The control method for the robot according to claim 1, wherein
    the first work and the second work are continuously performed.

6. A robot system comprising:
    a robot having a robot arm, the robot arm being configured to perform first work on a first working object and perform second work of a same type as the first work on a second working object of a same type as the first working object;
    a memory configured to store a program; and
    a processor configured to execute the program so as to:
        obtain first information relating to configurations of the first and second working objects and positions of the first and second working objects within a robot coordinate system from a memory;
        set a plurality of initial target positions with respect to the first working object within the robot coordinate system based on the first information, the first working object being in a three-dimensional shape having a first outer periphery and a first inside interior of the first outer periphery, the plurality of initial target positions being located at the first inside interior of the first working object;
        set an initial target trajectory along which a control point on the robot arm passes such that a tool center point of a tool attached to the robot arm passes through the plurality of initial target positions;
        execute the first work on the first working object by operating the robot arm with force control based on the set initial target trajectory;
        detect an actual trajectory along which the control point passes during the execution of the first work on the first working object with the force control;
        store the actual trajectory into the memory;
        set a plurality of updated target positions with respect to the second working object based on the actual trajectory, the second working object being in a three-dimensional shape having a second outer periphery and a second inside interior of the second outer periphery, the plurality of updated target positions being located on the second outer periphery of the second work object; and
        execute the second work on the second working object by operating the robot arm with the force control based on the set plurality of updated target positions.

7. The robot system according to claim 6, wherein
    the processor is further configured to create a learning model having a data relating to an input trajectory of the robot arm and a force applied to the robot arm as input and a data relating to an updated trajectory of the robot arm as output.

* * * * *